United States Patent
York

[15] 3,698,264
[45] Oct. 17, 1972

[54] COMPOSITE ROD
[72] Inventor: Ray A. York, Villa Park, Calif.
[73] Assignee: Bertea Corporation, Irvine, Calif.
[22] Filed: Dec. 28, 1970
[21] Appl. No.: 101,844

[52] U.S. Cl. .....................74/581, 92/151, 92/255, 267/70, 287/125
[51] Int. Cl. .............................................F16c 7/02
[58] Field of Search......74/581, 586, 579 R; 267/151, 267/70; 287/125; 92/150, 151, 255

[56] References Cited

UNITED STATES PATENTS

| 2,888,257 | 5/1959 | Taylor | 74/581 X |
| 172,903 | 2/1876 | Adams | 74/581 |
| 1,915,198 | 6/1933 | Nyborg | 74/581 |
| 3,255,675 | 6/1966 | Reeve et al. | 62/151 X |

Primary Examiner—William F. O'Dea
Assistant Examiner—F. D. Shoemaker
Attorney—Smyth, Roston & Pavitt

[57] ABSTRACT

A composite rod comprising an elongated outer rod section and an inner rod section within the outer rod section. The stiffness of the inner rod section is greater than the stiffness of the outer rod section. The outer rod section is preloaded in tension and the inner rod section is preloaded in compression.

13 Claims, 5 Drawing Figures

PATENTED OCT 17 1972  3,698,264

INVENTOR:
Ray A. York
By: Smyth, Roston & Pavitt
ATTORNEYS

COMPOSITE ROD

BACKGROUND OF THE INVENTION

Various power transmission system require one or more links and/or rods to transmit motion from one member to another. The stiffness of the rod or link, i.e., its ability to resist deformation is an important consideration in many systems. For example, in aircraft control systems, it is often desirable to maximize stiffness of the mechanical force transmitting members to thereby increase the system spring constant and improve system stability. Although stiffness in bending is important, resistance to deformation in response to generally axial loading is usually of paramount importance in rod design. Stiffness against axial loading is proportional to AE/L where A is the cross sectional area of the rod, E is the modulus of elasticity of the rod and L is the length of the rod.

The obvious way to increase stiffness is to increase the cross sectional area of the rod. However, this is very undesirable because it adds to the weight and cost of the rod. The additional weight penalty makes this totally unsuited for aircraft applications.

Another way to increase stiffness is to select a material having a relatively high modulus of elasticity. Unfortunately high modulus materials such as beryllium are inherently brittle, difficult to machine and extremely difficult to join to other elements. These practical considerations prevent the substitution of high modulus materials for the materials usually employed.

SUMMARY OF THE INVENTION

The present invention provides a high modulus rod or link which does not have any of the disadvantages noted above. This is accomplished by providing a composite rod which includes an outer rod member and an inner rod member within the outer rod member. The outer rod member is constructed of a material which can be easily joined to an adjacent member such as a ferrous metal. The inner rod member is made stiffer than the outer rod member, and this can be brought about at least in part by constructing the inner rod member essentially of a high modulus material such as beryllium or boron-carbide. These materials offer the additional advantage of being of low density.

A feature of this invention is that the composite rod is preloaded with the inner rod member being in compression and the outer rod member being in tension. When a tensile load is applied to the outer rod member it undergoes a first increment of elongation. Because the rod members are structurally interrelated, the inner rod member elongates a corresponding amount. The elongation of the inner rod member relieves some of the compressive preload on the inner rod member with the degree of unloading being a function of the stiffness of the inner rod member. This in turn reduces the tensile preload on the outer rod member.

The relationship between the total tensile load on the outer rod member and the external tensile load on outer rod member is a function of the relative stiffnesses of the rod members. Because the inner rod member is stiffer than the outer rod member, the compressive preload is removed at a relatively high rate as the external tensile forces on the outer rod member are increased. The result is that substantial external tensile forces can be applied to the outer rod member without significantly elongating the outer rod member and without substantially increasing the total tensile load in the outer rod member. As the total elongation of the composite rod is small even when substantial tensile forces are applied thereto, the composite rod has substantial stiffness in tension.

Application of a compressive load to the outer rod member decreases the tensile preload therein and increases the compressive load on the inner rod member. However, because the difference in stiffnesses of the rod sections, the tensile load on the outer rod member is reduced by an amount which is much less than the increase in the compressive load on the inner rod member. Thus, the compressive load is borne by the inner rod member, and this is desirable because low modulus materials typically have high compressive strengths.

The overall effect of the composite rod is an increase in stiffness in tension and compression. With this invention, the stiffness advantage of a high modulus material is obtained without the attendant disadvantages of difficulty of joining as the joining function is carried out by the outer rod member.

Obviously, the outer rod member can be preloaded in tension over all or only a portion of its length. The outer rod member is considered to be preloaded regardless of whether the preload acts over all or a portion of its length. Similarly, the inner rod member is considered to be preloaded in compression whether such preload acts over all or only a portion of its length.

Another advantage of the composite rod is that it is highly resistant to fatigue failure. Fatigue failure is not likely to occur to a member in compression, and therefore the inner rod member, which is never in tension, presents virtually no fatigue problem.

Fatigue failure can, however, occur to a member in tension. The likelihood of fatigue failure is related to the magnitude of the changes in the load applied to the member. The present invention minimizes the change in load on, and the deflection of, the outer rod member in the manner described above, and this significantly reduces the likelihood of a fatigue failure of the outer rod member.

High modulus materials such as beryllium and boron-carbide are preferred for the inner rod member because of their high moduli of elasticity and light weight. However, some fatigue advantages can be obtained if the inner rod member is made stiffer than the outer rod member due to other factors such as a greater cross sectional area and/or a shorter length. As a practical matter, length of the inner rod member will normally be controlled by the necessity to support the outer rod member over a major portion of the length thereof. This leaves the cross sectional area as the only other practical variable (other than the modulus of elasticity) in determining stiffness.

Another advantage of the composite rod is that it possesses a high resistance to transverse vibration. The ability of a rod to resist transverse vibration is a function of the stiffness of the rod in bending and the weight of the rod. Assuming that the rod has a reasonable section modulus, the stiffness of the composite rod in bending is substantially due to the high modulus of elasticity of the inner rod member. In addition, the weight of the rod is reduced because the present invention uses high modulus materials which are of low density.

The composite rod also possesses substantial radial stiffness. This allows reducing of the wall thickness of the outer rod member without danger of radial inward collapse due to forces which may be applied thereto such as hydrostatic pressure.

Although the composite rod can be used as a stationary structural member, it is particularly adapted for use in a power or motion transmitting linkage. The composite rod is also particularly adapted for use as the actuator rod of a fluid actuator such as an hydraulic actuator.

The outer rod member can advantageously be in the form of a sleeve and the inner rod member is received within the sleeve and is supported by an abutment or shoulder formed on the outer rod member. A stressing member is mounted on the outer rod member as by screw threads and is engageable with the inner rod member so that by turning of the stressing member, the outer rod member can be preloaded in tension and the inner rod member can be preloaded in compression.

When the composite rod is used as an actuator rod for a dual actuator, first and second pistons are mounted thereon in axially spaced relationship. In this event the outer rod member preferably includes first and second abutments for supporting the inner rod member. The first and second abutments are located adjacent the first and second pistons, respectively, so that as each of the pistons is loaded by fluid pressure, they may act on a closely adjacent portion of the inner rod member.

The invention can best be understood by reference to the following description taken in connection with the accompanying illustrative drawing.

DESCRIPTION OF THE PREFERRED EMBODIMENTS

Figure 1:
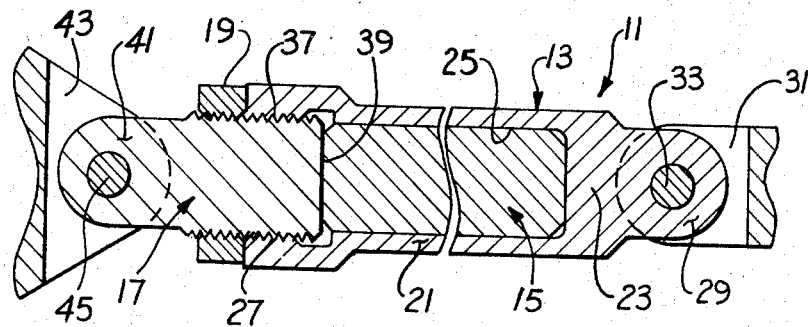
FIG. 1 is an axial sectional view through one form of composite rod constructed in accordance with the teachings of this invention.

FIG. 1 illustrates an elongated composite rod 11 constructed in accordance with the teachings of this invention. The composite rod 11 includes an outer rod member 13, an inner rod member 15, a preloading member 17 and a lock nut 19. The rod members 13 and 15 are coaxial and are elongated in the axial direction. The outer rod member 13 in the embodiment illustrated is generally tubular and has a cylindrical wall 21 and end wall 23. The cylindrical wall 21 and the end wall 23 cooperate to define an axially extending cylindrical passage or cavity 25. The outer end of the cylindrical wall 21 has internal screw threads 27 and the opposite end of the rod member 13 has a generally axially extending flange 29 which is suitably pivotally connected to a link 31 as by a pin 33.

The inner rod member 15 preferably conforms to the configuration of the passage 25, and accordingly, in the embodiment illustrated, the inner rod member is generally cylindrical. The inner rod member 15 is received within the passage 25 and one end thereof engages the end wall 23 and is supported thereby.

The preloading member 17 has external threads 37 thereon which cooperate with the threads 27 to connect the preloading member to the outer rod member 13. The preloading member 17 terminates in an end face 39 which, in the embodiment illustrated, bears directly against one end of the inner rod member 15. By screwing the preload member 17 into the outer rod member 13, the inner rod member 15 is axially preloaded between the end face 39 and the end wall 23 and the outer rod member is preloaded in tension by virtue of the tensile load in the cylindrical wall 21. The preloading member 17 has a flange portion 41 which is pivotally connected to fixed structure 43 as by a pin 45.

The lock nut 19 is received on the preloading member 17 and bears against the outer annular end face of the cylindrical wall 21. The lock nut 19 functions to prevent unintentional relative rotation between the preloading member 17 and the outer rod member 13 in a direction tending to remove the compressive axial preload on the inner rod member 15.

The outer rod member 13 is constructed of a material which can be readily joined to the preloading member 17 and to the adjacent structure, i.e., the link 31. In the embodiment illustrated, the outer rod member 13 is constructed of steel and the wall 21 is relatively thin radially. The overall length of the link is normally controlled by the required spacing between the fixed structure 43 and the link 31. The outer rod member 13 preferably extends for a major portion of the length of the composite rod 11.

The inner rod member 15 is preferably constructed of a lightweight, high modulus material such as beryllium or boron-carbide. The following table compares the pertinent properties of steel, beryllium, and boroncarbide:

|  | Steel | Beryllium | Boron-carbide |
| --- | --- | --- | --- |
| Modulus of Elasticity | $29 \times 10^6$ | $45 \times 10^6$ | $42 \times 10^6$ |
| Density (lbs/in.$^3$) | .283 | .067 | .09 |

The inner rod member 15 is stiffer than the outer rod member because of its higher modulus of elasticity, and because in the embodiment illustrated, it has a greater cross sectional area than the wall 21.

The cross sectional areas and configurations of the rod members 13 and 15 can be varied depending upon design requirements and the annular and cylindrical configurations of FIG. 1 are merely illustrative. Of course, the cylindrical configuration shown is desirable because it facilitates joining of the outer rod member 13 and the preloading member 17.

To preload the composite rod 11, the preloading member 17 is screwed into the cylindrical wall 21 to cause the end face 39 to bear against the inner rod member 15. This squeezes the inner rod member 15 axially between the end face 39 and the end wall 23 to thereby place an axial, compressive preload on the inner rod member. The compressive preloading force applied to the inner rod member 15 is reacted through the threads 27 and 37 to thereby place an equal tensile force on the outer rod member 13 and in particular on the wall 21 between the end wall 23 and the threads 37. The magnitude of the preloading force will vary depending upon numerous factors including the relative stiffness of the rod members 13 and 15 and the load which must be transmitted by the composite rod 11.

Figures 2A, 2B:
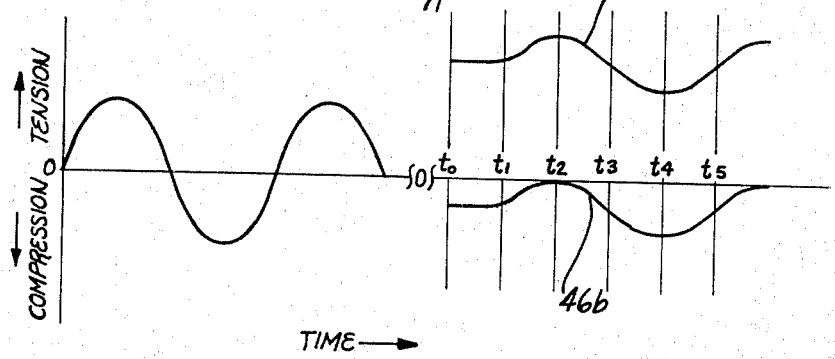
FIG. 2a is a plot of stress versus time for a conventional one-piece rod or link.
FIG. 2b is a plot of stress versus time for the composite rod of this invention.

The concepts underlying the invention can best be understood by reference to FIGS. 2a and 2b. FIG. 2a is an illustrative plot of stress in psi in a conventional rod versus time with the portion of the curve a above the abscissa representing tension and the portion of the curve beneath the abscissa representing compression. From FIG. 2a it can be seen that the force in a conventional rod varies widely between the maximum tensile force applied to the rod and the maximum compressive force applied to the rod with the magnitude of such forces and the frequency with which forces change being a function of external factors.

FIG. 2b shows a curve 46a which represents the variation of total tensile stress in the outer rod member 13. FIG. 2b also shows a curve 46b which represents the variation of total compressive stress in the inner rod member 15. The first portions of the curves 46a and 46b from time t0 to time t1 represent the amount of preload stress in the outer rod member 13 and the inner rod member 15. If an external tensile load is applied to the composite link 11 by the link 31 and the fixed structure 43, the wall 21 elongates axially slightly. This permits axial elongation of the compressively preloaded inner rod member 15 to thereby remove the compressive preload. Because the inner rod member 15 is stiffer than the outer rod member 13, the compressive preload is rapidly removed as the external tensile load on the composite link 11 increases. This result is indicated graphically between the times t1 and t2 in FIG. 2b where it can be seen that the total tensile stress in the outer link 13 increases only slightly in response to the application of a maximum anticipated tensile load. During this time, the compressive load on the inner rod member 15 drops to substantially 0. Removal of the external tensile load causes a reversal of this effect as indicated between the times t2 and t3.

If a compressive load is applied by the fixed structure 43 and the link 31, some of the tensile preload is removed in the wall 21 as shown between times t3 and t4 in FIG. 2b. This increases the compressive load on the inner rod member an amount which approximately equals the external compressive load applied minus the amount which the compressive preload is removed by the external compressive load. The period from t4 and t5 illustrates removal of the compressive load and a return to initial operating conditions where the external load is 0 and the only load on the composite link 11 is the preload.

As shown in FIG. 2b, the change in magnitude of the stress in the wall 21 of the outer rod member 13 is minimized and is substantially less than the stress variation felt by a conventional rod shown in FIG. 2a. The variation in compressive stress in the inner rod 15 is substantial but is still less than the variation in stress for a conventional rod as shown in FIG. 2a.

The composite rod 11 may be used in various environments and the environment illustrated in FIG. 1 is merely illustrative. Thus, the composite rod may be utilized as a stationary support element. Alternatively, the fixed structure 43 may also be a movable link.

Figure 3:
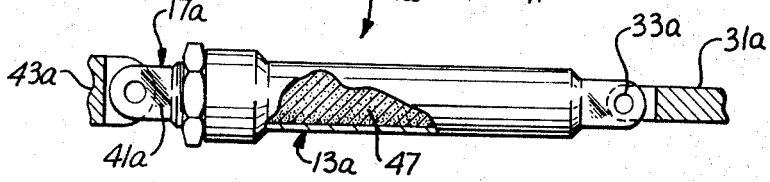
FIG. 3 is a side elevational view with parts broken away of a second embodiment of composite rod.

FIG. 3 shows a modified composite rod 11a which is identical to the composite rod 11 in all respects not specifically noted herein. In FIG. 3, parts corresponding to parts of FIG. 1 are designated by corresponding reference characters followed by the letter a. The composite rod 11a is identical to the composite rod 11 except that a particulate substance 47 has been substituted for the inner rod member 15. The particulate substance 47 is confined by the outer rod member 13a and by the preloading member 17a. The particles of the substance 47 should be small and the substance 47 should be compacted. The particulate substance 47 may be beryllium or boron-carbide. When the substance 47 is confined as shown in FIG. 3, it should have a high modulus of elasticity and be stiffer than the outer rod member 13a.

Figure 4:
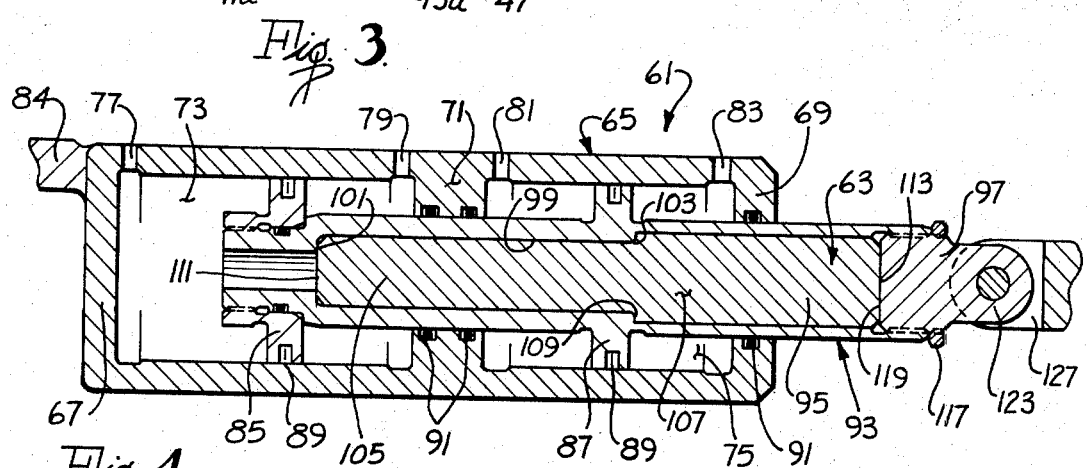
FIG. 4 is a schematic section view of an hydraulic actuator having the composite rod embodied therein as an actuator rod.

FIG. 4 shows an actuator 61 which includes a composite actuator rod 63. The actuator 61 also includes a housing 65 having end walls 67 and 69 and a partition 71 for separating the housing into two working cylinders 73 and 75. Ports 77 and 79 provide for fluid flow into and out of the cylinder 73 and ports 81 and 83 provide for fluid flow into and out of the cylinder 75. The housing 65 is mounted either rigidly or pivotally on fixed supporting structure 84.

Fluid pressure responsive pistons 85 and 87 are mounted for axially sliding movement in the cylinders 73 and 75, respectively. The pistons 85 and 87 are mounted on the composite actuator rod 63 for movement therewith. The actuator rod 63 is movable axially relative to the housing 65 and it projects through the end wall 69 and the partition 71. Suitable seals 89 form substantially fluid tight seals between the pistons 85 and 87 and the housing 65, and seals 91 seal between the housing 65 and the actuator rod 63.

The actuator rod 63 embodies a number of the features described hereinabove with reference to FIGS. 1 and 2b. The composite actuator rod 63 includes an outer rod member 93, an inner rod member 95, and a preloading member 97. The outer rod member 93 is generally tubular and has an axial passage or cavity 99 therein. The outer rod member 93 has axially spaced annular shoulders or abutments 101 and 103 lying closely adjacent the pistons 85 and 87, respectively.

The inner rod member 95 includes two coaxial cylindrical sections 105 and 107 with a shoulder 109 being formed therebetween. The inner rod member 95 has end faces 111 and 113. The inner rod member 95 is positioned within the passage 99 with the end face 111 and the shoulder 109 bearing against the abutments 101 and 103, respectively. The sections 105 and 107 generally conform to the surrounding portions of the outer rod member 93. The inner rod member 95 could consist of particulate matter as described above in connection with FIG. 3.

The preloading member 97 is threadedly attached to one end of the outer rod member 93 and is held against counter rotation by a suitable locking member 117. The preloading member 97 has an end face 119 which bears against the end face 113 of the inner rod member 95. The preloading member 97 has a flange 123 for pivotally attaching the actuator 61 to a movable link 127.

By tightening of the preloading member 97, the section 107 is preloaded in compression between the abutment 103 and the end face 119 and the section 105 is preloaded in compression by the end face 119 and the abutment 101.

To operate the actuator 61, fluid such as hydraulic fluid under pressure is supplied by control means (not shown) through the ports 79 and 83 and the ports 77 and 81 are connected to a conduit at return pressure. The fluid acts on the righthand faces (as viewed in FIG. 4) of the pistons 85 and 87 thereby tending to move the actuator rod 93 to the left. Such movement of the actuator rod is resisted by the movable link 127 and/or the equipment connected thereto. Accordingly, the outer rod member 93 is placed in tension with the result that the preset compressive load on the inner rod member 95 is removed or partially removed. Thus, the outer rod member 93 is loaded in accordance with the curve 46a in FIG. 2b and the inner rod member 95 is loaded in accordance with the curve 46b in FIG. 2b. Of course, the composite rod 63 is compressively loaded when fluid under pressure is supplied through the ports 77 and 81 and the ports 79 and 83 are connected to return pressure.

The hydraulic forces applied to the pistons 85 and 87 are additive. Although the abutment 103 could be eliminated, if it were, the tensile forces created as a result of the application of fluid under pressure to the piston 87 would be operative to relieve the compressive preload of the inner rod member 93 only by transmission of those forces through the portion of the outer rod member intermediate the pistons 87 and 85. To avoid this, it is preferred to provide one abutment or bearing surface for each of the pistons and to locate the abutments closely adjacent the associated pistons as shown in FIG. 4.

Although exemplary embodiments of the invention have been shown and described, many changes, modifications, and substitutions may be made by one having ordinary skill in the art without necessarily departing from the spirit and scope of this invention.

I claim:

1. A composite rod comprising:
    an elongated outer rod section having a cavity therein extending generally axially of the outer rod section, said outer rod section being subjected to a substantial axial tensile force of a first predetermined magnitude whereby said outer rod section is elongated a first predetermined amount per unit of force applied thereto;
    a compressive element in said cavity, said element being supported by said outer rod section and being subjected to an axial compressive force of a second predetermined magnitude whereby the element is axially shortened a second predetermined amount per said unit of force applied thereto, said first predetermined amount being greater than said second predetermined amount whereby placing an axial load on the composite rod results in a relatively small change of length of said outer rod section to thereby reduce fatigue; and
    at least a portion of said element being in particulate form.

2. A composite rod as defined in claim 1 wherein said element is of less density than said outer rod section.

3. A composite rod comprising:
    an outer rod section having a cavity therein, said outer rod section having an abutment in said cavity;
    an inner rod section in said cavity supportable against said abutment;
    a stressing member drivingly connectible to said outer rod section to load said inner rod section in compression between said member and said abutment and to apply a tensile force to said outer rod section;
    said inner rod section being constructed of a material having a higher modulus of elasticity than the material of said outer rod section, the density of said inner rod section being no greater than the density of the outer rod section; and
    a piston on said outer rod section.

4. A composite rod as defined in claim 3 wherein said abutment is a first abutment, said outer rod section having a second abutment in said cavity spaced axially along said inner rod section, said inner rod section being supportable against said first and second abutments, said stressing member also holding said inner rod section in compression between said abutments.

5. A composite rod comprising:
    an outer rod section having a cavity therein, said outer rod section having an abutment in said cavity;
    an inner rod section in said cavity supportable against said abutment;
    a stressing member drivingly connectible to said outer rod section to load said inner rod section in compression between said member and said abutment and to apply a tensile force to said outer rod section;
    said inner rod section being constructed of a material having a higher modulus of elasticity than the material of said outer rod section, the density of said inner rod section being no greater than the density of the outer rod section; and
    said outer rod section being constructed of steel and said inner rod section being constructed of beryllium, said outer rod section having means adjacent one end thereof for attachment to external structure, said stressing member and said outer rod section being threadedly attached, said stressing member having means for attachment to external structure, the cross sectional area of the outer rod being less than the cross sectional area of the inner rod.

6. An actuator for driving a driven element comprising:
    a housing;
    a piston slidable in said housing;
    a composite actuator rod at least partially receivable in said housing, said composite actuator rod including an inner rod section and an outer rod section substantially surrounding the inner rod section, said outer rod section having an abutment against which the inner rod section is supportable and means connectible to the outer rod section for loading said inner rod section generally axially in compression and for loading said outer rod section generally axially in tension;

means for mounting said piston on said composite actuator rod, said composite actuator rod being connectible to said driven element; and port means in said housing for admitting fluid under pressure to at least one side of said piston to thereby drive the latter and the composite actuator rod.

7. An actuator as defined in claim 6 wherein said outer rod section and said inner rod section consist essentially of first and second materials, respectively, said first material having a greater density than said second material, said inner rod section being stiffer than said outer rod section.

8. An actuator as defined in claim 7 wherein the modulus of elasticity of said second material is greater than the modulus of elasticity of said first material.

9. An actuator as defined in claim 6 wherein said piston is a first piston and said abutment is a first abutment, said actuator including a second piston and means for mounting said second piston on said outer rod section in axially spaced relationship to said first piston, said outer rod section including a second abutment, said inner rod section being supportable against said abutments, said first and second abutments being adjacent said first and second pistons, respectively.

10. A composite rod comprising:
an outer member having a cavity therein, said outer member being of a predetermined stiffness, said outer member being attachable to external structure at first and second spaced locations, said cavity lying at least in part between said locations;
an inner member in said cavity, said inner member being of greater than said predetermined stiffness;
means for preloading the inner member in compression along a first axis which extends generally between said first and second spaced locations;
means for preloading the outer member in tension substantially along said first axis, said members being drivingly associated so that placing an external tensile force on the outer member reduces the compressive preload on the inner member; and
said outer member being constructed in substantial part of a ferrous metal and said inner member being constructed in substantial part of a material having a higher modulus of elasticity and a lower density tan said ferrous metal.

11. A composite rod as defined in claim 10 wherein said material is beryllium.

12. A composite rod as defined in claim 10 wherein said material is boron-carbide.

13. A stiff composite rod for transmitting force with a minimum deflection of said composite rod, said composite rod comprising:
an elongated tubular rod constructed in substantial part of a ferrous metal;
an elongated inner rod within said tubular rod member;
means coupled to said tubular rod and engageable with said inner rod for applying a compressive preload to said inner rod and a tensile preload to said tubular rod; and
said inner rod having a higher modulus of elasticity than said ferrous metal.

* * * * *